United States Patent
Shaparew

[11] 4,074,378
[45] Feb. 21, 1978

[54] AIR VENTILATOR FOR BEEHIVES

[76] Inventor: Vladimir Shaparew, R.R. No. 1, Oakville, Ontario, Canada, L6J 4Z2

[21] Appl. No.: 740,744

[22] Filed: Nov. 10, 1976

[51] Int. Cl.² ............................................. A01K 47/06
[52] U.S. Cl. ............................................................ 6/1
[58] Field of Search .................. 6/1 R, 2 R, 4 R, 4 A, 6/4 B, 4 M; 98/20, 70, 78

[56] References Cited

U.S. PATENT DOCUMENTS

| | | | |
|---|---|---|---|
| 3,302,552 | 2/1967 | Walsh | 98/78 |
| 3,927,431 | 12/1975 | Wallace | 6/1 |

FOREIGN PATENT DOCUMENTS

| | | | |
|---|---|---|---|
| 869,884 | 1961 | United Kingdom | 6/1 |

*Primary Examiner*—Louis G. Mancene
*Assistant Examiner*—Peter K. Skiff
*Attorney, Agent, or Firm*—Larson, Taylor and Hinds

[57] ABSTRACT

An air ventilator for beehives is provided which produces positive ventilation of a hive in an extremely simple and inexpensive manner. The ventilator is mounted on the hive so as to communicate with an outlet aperture which is conventionally provided in a hive to afford convective ventilation. The ventilator includes a first tubular portion or tube which extends perpendicular to the hive and a second tubular portion or tube which is formed integrally with and extends transverse to the first tube. The end sections of the second tube are of greater cross-sectional area than the portion of the second tube adjacent to the first tube, and comprise flared cones in an exemplary embodiment. Thus, when there is air movement in the direction of the second tubular portion, the stagnation pressure established within these end sections produces a suction effect in the portion of the second tube adjacent the first tube that draws air out of the hive. Moreover, the transverse air passages provided by the tubes prevent direct wind blasts from entering the hive through the outlet aperture.

3 Claims, 2 Drawing Figures

AIR VENTILATOR FOR BEEHIVES

FIELD OF THE INVENTION

The present invention relates to ventilation systems for bee hives.

BACKGROUND OF THE INVENTION

It is necessary to provide air ventilation of the brood chambers of a beehive throughout the entire year. In accordance with conventional practice, an outlet hole or aperture, normally about three-quarters of an inch in diameter, is drilled in the wall of the brood chamber. With this arrangement, cooler air will enter the entrance opening for the bees (located near the bottom of the hive) and the warmer air will exit through the outlet aperture.

Such convective ventilation is not always adequate. For example, during the winter, snow will cover the entrance opening and the convective air circulation is drastically reduced. Under these circumstances, many bees, sometimes the whole bee colony, may suffocate due to lack of oxygen. Another problem concerns the generation of moisture. Bees, through normal biological process, generate moisture which can build up within the hive. Prolonged, excessive moisture content in the air of the hive will seriously affect the health of the bees so that, again, some or all may die. Under some circumstances, such as discussed above, the outlet aperture is not able to exhaust the excess moisture. A further difficulty with a simple aperture is that direct wind blasts are substantially free to enter the hive through the aperture, with resultant deleterious effects.

Patents of interest with respect to the present invention include U.S. Pat. Nos. 3,927,431 (Wallace); 442,687 (Pennock); 207,731 (Gale); 80,257 (Bassett); 31,384 (Hartley et al); and 2,707 (Ross), although this listing is not represented to be exhaustive.

SUMMARY OF THE INVENTION

According to the present invention, a ventilator for beehives is provided which overcomes the problems discussed above. The air ventilator of the invention provides positive, although intermittent, ventilation of the hive to eliminate problems associated with depletion of oxygen and to exhaust excess moisture. Moreover, the air ventilator of the invention prevents direct wind blasts from entering the hive. Further, and very importantly, the air ventilator of the invention is rugged, contains no moving parts, and is extremely simple and inexpensive to manufacture and maintain, so that use thereof with a hive is practical and the cost thereof is not prohibitive.

In accordance with a preferred embodiment thereof, the air ventilator of the invention comprises a first tubular portion or tube which, when the ventilator is mounted on the hive extends perpendicularly outward from, and defines an air passage which communicates with, the outlet aperture of the hive, and a second tubular portion or tube which is formed integrally with and extends perpendicular to the first tube, the air passage defined by the second tube communicating with the air passage of the first tube through an opening in the side of the latter. The second tube is flared or otherwise shaped at the ends thereof such that the cross-sectional area of the end portions are greater than that of the central portion adjacent to the first tube. With this arrangement, when there is air movement in the direction of the longitudinal axis of the second tube, a stagnation effect will be created in the end sections which will result in the creation of suction in the constricted central portion adjacent the first tube. This suction will draw air out of the hive (the air in the hive being at ambient pressure) and thus will provide positive air ventilation of the hive in an extremely simple manner. The suction created will also cause cooler air to be drawn into the entrance opening for the bees and thus air within the hive, which may be heavily laden with moisture, will be sucked out through the outlet aperture to ensure that there is adequate air circulation within the hive and that the moisture content of the air in the hive is maintained at safe levels.

Other features and advantages of the invention will be set forth in, or apparent from, the detailed description of a preferred embodiment found hereinbelow.

DESCRIPTION OF THE PREFERRED EMBODIMENTS

Figure 1:
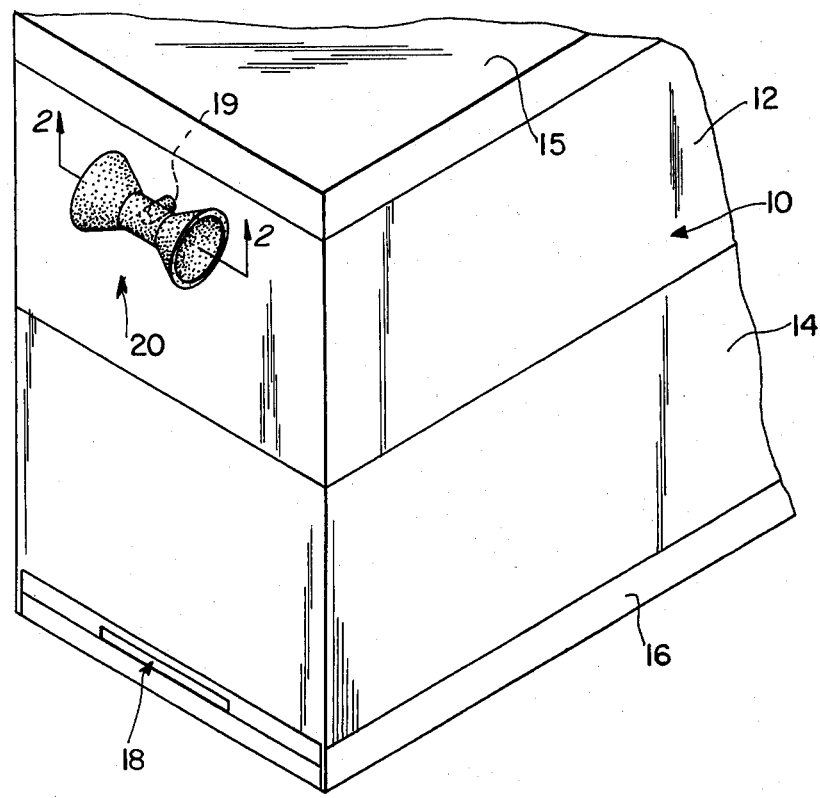
FIG. 1 is a perspective view of a beehive incorporating the air ventilator of the invention.

Referring to FIG. 1, a beehive is shown which is generally denoted 10. Beehive 10 is of a conventional design apart from the air ventilator of the present invention, which is generally denoted 20. Thus, the construction of the hive 10 will be considered only briefly. The exemplary hive illustrated in FIG. 1 basically comprises an upper brood chamber 12 and a lower brood chamber 14, although the invention is obviously applicable to single or multiple brood chamber hives having chambers of any size or shape. The brood chambers 12, 14 contain frames (not shown) on which the wax comb and bees are located. Hive 10 includes a top cover 15 and a bottom "board" 16, the latter of which includes an entrance opening 18 formed therein through which the bees gain access to the hive.

As discussed hereinabove, hive 10 would conventionally include an outlet aperture or hole, which is obscured by an air ventilator 20 in FIG. 1 but is indicated generally at 19. In a conventional hive, an aperture corresponding to aperture 19 cooperates with the entrance opening to provide convective ventilation, cooler air entering through the entrance opening and warmer air leaving through the aperture.

Figure 2:
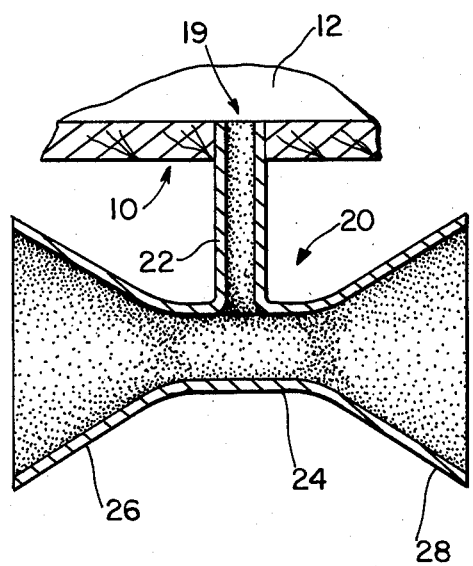
FIG. 2 is a sectional view, to an enlarged scale, taken generally along line 2—2 of FIG. 1.

As can best be seen in FIG. 2, the air ventilator 20 of the invention comprises a tubular section 22 which is mounted in the wall of one of the brood chambers (viz., upper chamber 12 in the specific embodiment illustrated) and which extends perpendicularly outwardly therefrom. A second tubular portion 24 is formed integrally with and extends perpendicularly to tubular portion 22. Portion 24 includes an opening in one side thereof which provides communication with the air passage formed by tubular portion 22 and thus with the interior of the hive 10. Ventilator 20 also includes generally conical portions, or cones, 26 and 28 which are respectively located at the ends of tubular portion 24 so that the air passageway formed by tubular portion 24 is flared outwardly at the ends thereof.

As discussed above, according to an important aspect of the invention, wind or air which moves in the general direction of the common longitudinal axis of tubular portion 24 and conical portions 26, 28 will produce air stagnation within the conical portion 26 or 28 (depending on the direction of air movement). The stagnation pressure causes acceleration of the air through tubular portion 24 which consequently causes a lowering of the pressure within tubular portion 24 to a value below the ambient pressure external to tubular portion 24. Stated differently, tubular portion 24 being constricted with respect to conical portions 26, 28 serves as a venturi wherein in the speed of the air flow is increased and the pressure decreased below ambient. Because of the air pressure within brood chamber 12 is also at ambient, the lower pressure within tubular portion 24 produces a suction effect. This suction draws air out from the brood chamber 12 through tubular portion 22 into tubular portion 24, this air mixing with the air flowing directly through tubular portion 24.

It will be appreciated that the suction forces created by air ventilator 20 will cause fresh air to be sucked into the brood chambers 12, 14 through the entrance opening 18, even if that opening is covered with snow, and through any cracks in or between the side walls, top cover and bottom board. Thus, the air ventilator of the invention establishes positive ventilation of the beehive whenever external air movement is present. Moreover, in the absence of any such air movement, the ventilator provides no impediment to the natural air convection which exists in conventional hives. Further, as noted above, the transverse air passages of ventilator 20 prevent direct wind blasts from entering the ventilation aperture 19.

It will be understood that the air ventilator of the invention can take other forms that are not specifically shown and described. While the "double cone" construction illustrated possesses advantages with respect to simplicity of manufacture, other geometrical shapes, such as spherical, parabolic, elliptical and like shapes, can be utilized to achieve similar results.

Thus, although the invention has been described relative to an exemplary embodiment thereof, it will be understood by those skilled in the art that variations and modifications can be effected in this exemplary embodiment without departing from the scope and spirit of the invention.

I claim:

1. In combination, a hive for bees including a entrance opening for the bees and a ventilation aperture located in an upper portion of a side wall of the hive remote from and above the entrance opening so as to provide ventilation through natural air convection, and air ventilator means, mounted on the hive in communication with said ventilation aperture, for, responsive to air movement externally thereof, creating suction adjacent to said ventilation aperture so as to draw air out of said hive, and for preventing direct air flow into said ventilation aperture, said air ventilator means comprises means defining a first air passage perpendicular to the plane of the side wall in which said ventilation aperture is located and in communication with said ventilation aperture and means defining a second air passage extending transverse to said first air passage and in communication with said first air passage, said second air passage being in communication with said first air passage at a central location thereof intermediate the end portions thereof and the cross section of the end portions of said second air passage being larger than that of said central portion thereof.

2. The combination claimed in claim 1 wherein said means defining said second air passage includes flared portions at each end thereof.

3. The combination claimed in claim 1 wherein said means defining said first air passage comprises a generally tubular member and said means defining said second air passage comprises a further generally tubular member affixed to the first mentioned tubular member and in fluid communication therewith through an aperture in the side of the further tubular member, said further tubular member including conical end portions.

* * * * *